(12) United States Patent
Graham et al.

(10) Patent No.: US 12,156,580 B2
(45) Date of Patent: Dec. 3, 2024

(54) PAPER DISPENSER FOR COSMETICS

(71) Applicant: Eco.Logic Brands Inc., Manteca, CA (US)

(72) Inventors: Romeo Graham, Montreal (CA); Julie Corbett, Oakland, CA (US)

(73) Assignee: ECO.LOGIC BRANDS INC., Manteca, CA (US)

( * ) Notice: Subject to any disclaimer, the term of this patent is extended or adjusted under 35 U.S.C. 154(b) by 0 days.

(21) Appl. No.: 18/044,415

(22) PCT Filed: Sep. 8, 2021

(86) PCT No.: PCT/US2021/049356
§ 371 (c)(1),
(2) Date: Mar. 8, 2023

(87) PCT Pub. No.: WO2022/055921
PCT Pub. Date: Mar. 17, 2022

(65) Prior Publication Data
US 2023/0371675 A1    Nov. 23, 2023

Related U.S. Application Data

(60) Provisional application No. 63/075,715, filed on Sep. 8, 2020.

(51) Int. Cl.
| A45D 40/02 | (2006.01) |
| A45D 40/00 | (2006.01) |
| A45D 40/20 | (2006.01) |
| B65D 3/06 | (2006.01) |
| B65D 65/46 | (2006.01) |
| B65D 83/00 | (2006.01) |

(52) U.S. Cl.
CPC ............ A45D 40/02 (2013.01); B65D 3/06 (2013.01); B65D 65/466 (2013.01);
(Continued)

(58) Field of Classification Search
CPC ............ A45D 40/02; A45D 2040/0025; A45D 40/00; A45D 2040/0037; A45D 40/20;
(Continued)

(56) References Cited

U.S. PATENT DOCUMENTS 4,014,616 A * 3/1977 Mast, Jr. ................ B65D 83/04
401/292
4,621,935 A * 11/1986 Sussman ................ A45D 40/02
401/176

(Continued)

FOREIGN PATENT DOCUMENTS

| GB | 370954 A | 4/1932 |
| JP | 09065926 A | 3/1997 |

(Continued)

OTHER PUBLICATIONS

International Search Report and Written Opinion for International Application No. PCT/US2021/049356; International Filing Date Sep. 8, 2021; Report Mail Date Dec. 28, 2021 (pp. 1-8).
Extended European Search Report and Written Opinion for European Application No. 21867472.9; Report Mail Date Sep. 23, 2024 (8 Pages).

*Primary Examiner* — David J Walczak
(74) *Attorney, Agent, or Firm* — CANTOR COLBURN LLP

(57) ABSTRACT

A dispenser includes a housing having an inner volume and a push cup movable within the inner volume of the housing. A sleeve is arranged within the inner volume at a position between the cap and the push cup.

20 Claims, 11 Drawing Sheets

(52) U.S. Cl.
CPC .. *B65D 83/0022* (2013.01); *A45D 2040/0025* (2013.01); *A45D 2040/0037* (2013.01); *A45D 2040/207* (2013.01); *B65D 2565/386* (2013.01)

(58) Field of Classification Search
CPC .. A45D 40/205; A45D 2040/207; B65D 3/06; B65D 65/466; B65D 83/0022; B65D 2565/386
USPC .......................................... 401/12, 176, 179
See application file for complete search history.

(56) References Cited

U.S. PATENT DOCUMENTS

| | | | | |
|---|---|---|---|---|
| 5,421,663 | A | * | 6/1995 | Bravo .................. A47G 19/303 |
| | | | | 222/391 |
| 5,992,705 | A | * | 11/1999 | Lhuisset ............ B65D 83/0027 |
| | | | | 222/386 |
| 6,637,964 | B1 | | 10/2003 | Kuo |
| 7,658,566 | B2 | * | 2/2010 | Wangler ............... A47G 19/303 |
| | | | | 401/12 |

FOREIGN PATENT DOCUMENTS

| | | | |
|---|---|---|---|
| JP | 3575746 | B2 | 10/2004 |
| KR | 2020100013021 | U | 12/2010 |
| KR | 101592914 | B1 | 2/2016 |

* cited by examiner

PAPER DISPENSER FOR COSMETICS

CROSS-REFERENCE TO RELATED APPLICATIONS

This application is a National Stage Application of PCT/US2021/049356 filed Sep. 8, 2021, which claims the benefit of U.S. Provisional Application Ser. No. 63/075,715, filed Sep. 8, 2020, which is incorporated herein by reference in its entireties.

BACKGROUND

Packaging used for cosmetics can generate large amounts of waste. Traditionally, many cosmetic containers or dispensers are made from plastic or glass. For example, deodorant, such as commercial cream deodorant, was originally packaged in a jar and applied by fingertips. Later, deodorant was applied using a roll-on applicator packaging that operated in a similar manner to a ball-point pen. Currently stick-cream deodorants are the most popular form of deodorant packaging and applicators used today. Deodorant containers/dispensers are often plastic-based. Another example is lip balms which use similar mechanisms and packaging to deliver the cosmetic products.

SUMMARY

Paper such as molded fiber, fiber or pulp is degradable and recyclable. Paper containers for cosmetics benefit the environment and can be desirable when compared with plastic or glass containers. However, current paper containers are made of a plurality of parts that need to be joined together with glue and the manufacture of these bottles is complex and costly and involves significant use of adhesives (e.g., glue) and time. The use of adhesive during the assembly process poses a number of challenges. It can be slow, especially as the adhesive needs to be applied to a detailed path which is the case for a pulp bottle or container, resulting low manufacturing output and high cost. Additionally, adhesives properties are easily affected by factors that can be difficult to control including: humidity, temperature, compression, and settling time.

Accordingly, there is a need for paper-based dispensers for cosmetics. Additionally, there is a need for improved method for dispensing cosmetic products with mechanical structures without introducing additional connecting components.

The embodiments described herein can address the above needs by providing a paper dispenser for cosmetics, i.e., a paper-based dispenser for the cosmetics such as a paper-based apparatus and methods using the apparatus that can deliver cosmetics by incremental moving the cosmetic product upward or downward.

In one aspect, the present disclosure provides a dispenser comprising a housing, a cap on top of and engaged with the housing, and a push cup at the bottom of and engaged with the housing, the cap, the housing and the push cup defines an inner volume, a die cut paperboard residing in the inner volume and in-between the cap and the push cup. In some embodiments, the dispenser further comprises a cosmetic product on top of the push cup, inside the inner volume. In some embodiment, the die cut paperboard defines a void. In some embodiments, the cosmetic product is in the void. In some embodiments, the push cup is engaged with the die cut paperboard and is configured to move upward and/or downward. In some embodiments, the cosmetic product moves together with the push cup.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

According to an embodiment, dispenser includes a housing having an inner volume and a push cup movable within the inner volume of the housing. A sleeve is arranged within the inner volume at a position between the cap and the push cup.

In addition to one or more of the features described above, or as an alternative to any of the foregoing embodiments comprising a cosmetic product arranged within the inner volume upwardly adjacent the push cup.

In addition to one or more of the features described above, or as an alternative to any of the foregoing embodiments the cosmetic product and the push cup are movable together within the inner volume of the housing.

In addition to one or more of the features described above, or as an alternative to any of the foregoing embodiments the sleeve has a hollow interior and the cosmetic product is arranged within the hollow interior.

In addition to one or more of the features described above, or as an alternative to any of the foregoing embodiments the push cup is engaged with the sleeve such that the push cup and the sleeve are operable to move together upwardly and/or downwardly within the inner volume of the housing.

In addition to one or more of the features described above, or as an alternative to any of the foregoing embodiments the sleeve includes a plurality of openings, the push cup being engaged with the plurality of openings.

In addition to one or more of the features described above, or as an alternative to any of the foregoing embodiments the push cup includes a plurality of tabs, at least one of the plurality of tabs being receivable within the plurality of openings to couple the push cup to the sleeve.

In addition to one or more of the features described above, or as an alternative to any of the foregoing embodiments the push cup includes a plurality of tabs, at least one of the plurality of tabs being configured to engage the sleeve.

In addition to one or more of the features described above, or as an alternative to any of the foregoing embodiments the sleeve is a perforated sleeve.

In addition to one or more of the features described above, or as an alternative to any of the foregoing embodiments comprising a liner arranged within the inner volume and extending to an end of the housing.

In addition to one or more of the features described above, or as an alternative to any of the foregoing embodiments comprising a cosmetic product arranged within the inner volume, the liner being arranged between the cosmetic product and the housing.

In addition to one or more of the features described above, or as an alternative to any of the foregoing embodiments comprising a nozzle mounted at an end of the housing, wherein the nozzle forms an outlet of the dispenser.

In addition to one or more of the features described above, or as an alternative to any of the foregoing embodiments an outlet of the nozzle is smaller than an aperture at the end of the housing.

In addition to one or more of the features described above, or as an alternative to any of the foregoing embodiments comprising a cap movably mounted to an end of the housing.

In addition to one or more of the features described above, or as an alternative to any of the foregoing embodiments at least one of the housing and the push cup is formed from a paper-based material.

In addition to one or more of the features described above, or as an alternative to any of the foregoing embodiments at least one of the housing and the push cup is formed from a pulp-based material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAIL DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, and components have not been described in detail so as not to obscure the disclosure. Various modifications to the described embodiments will be apparent to those with skill in the art, and the general principles defined herein may be applied to other embodiments. The disclosure is not intended to be limited to the particular embodiments shown and described.

Figure 1A:
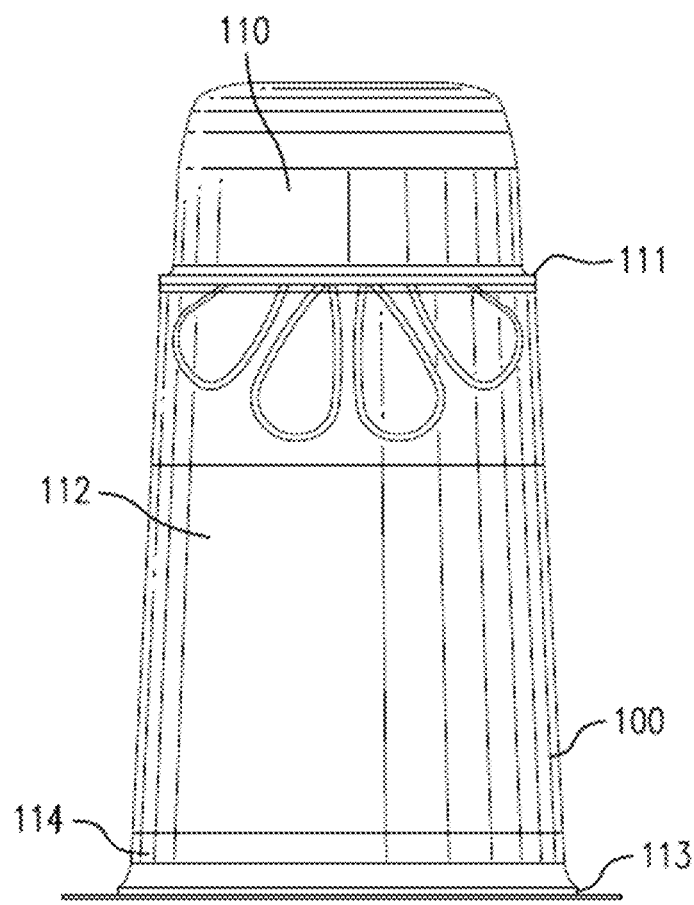
FIG. 1A provides an example of a dispenser according to an embodiment.
Figure 1B:
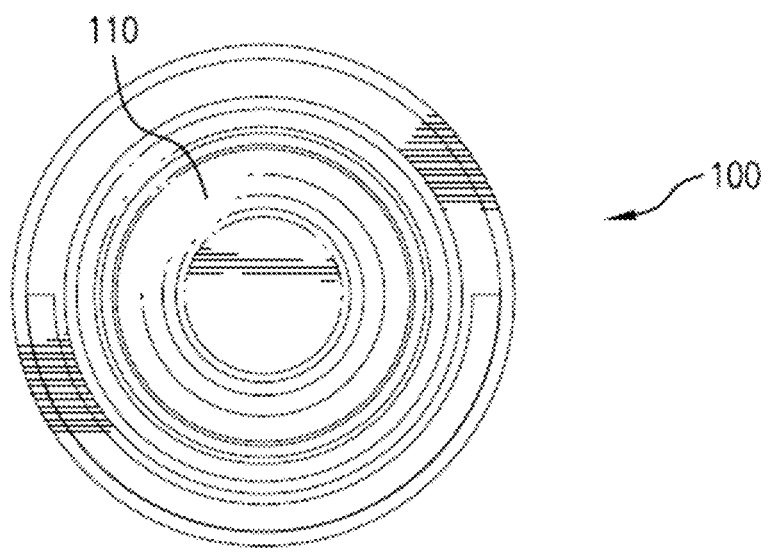
FIG. 1B provides a top view of the dispenser of FIG. 1 according to an embodiment.

With reference now to FIGS. 1A and 1B, an example of a dispenser 100 is illustrated. In the illustrated, non-limiting embodiment, the dispenser 100 comprises a cap 110, a housing 112, and a push cup 114. One or more of the cap 110, the housing 112 and the push cup 114 are formed from a paper-based material, for example, a pulp-based material. In some embodiments, the housing 112 can be made of a rolled-paper material. In some embodiments, the cap 110, the housing 112, and the push cup 114 can be fiber-, paper- or paper foam-based. In some embodiments, the cap 110, the housing 112, and the push cup 114 can be made from thermoformed pulp.

The housing 112 is an outer shell having a generally hollow inner volume. The cap 110 is movably connectable to a first end 111 of the housing 112 to seal an aperture of the open first end 111. In an embodiment, the cap 110 is removably connected to the housing 112. In such embodiments, the cap 110 may be separable from the housing 112, or alternatively, may be connected to the housing 112, such as via a hinge for example. All or at least a portion of the push cup 114 is receivable within the inner volume of the housing 112. During assembly or manufacture, the push cup 114 is typically installed within the inner volume at a position near the second, opposite end 113 of the housing 112. However, during use of the dispenser 100, the push cup 114 is configured to move within the hollow interior, such as towards the first end thereof.

Figure 2A:
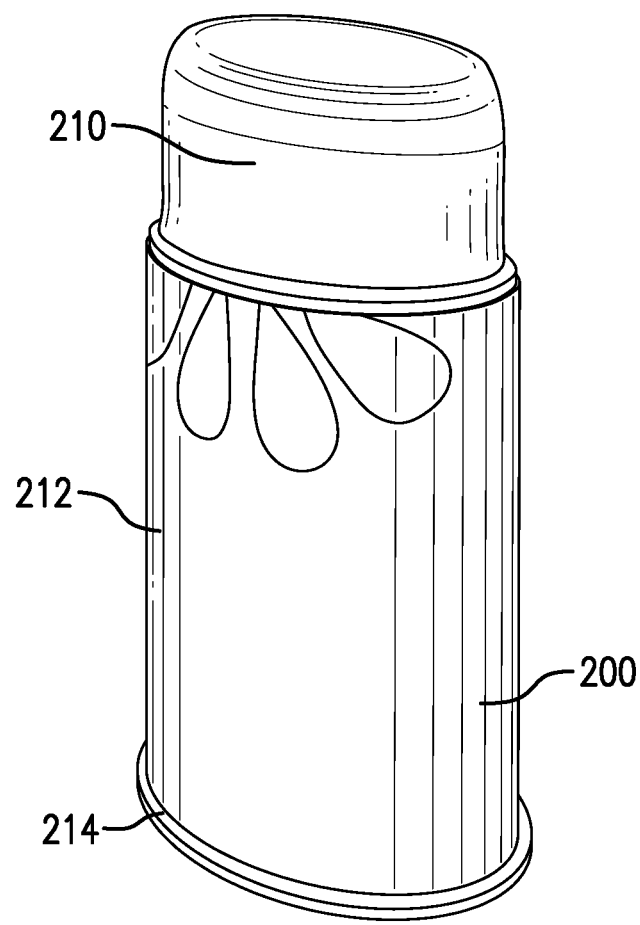
FIG. 2A illustrates another example of a dispenser according to an embodiment.
Figure 2B:
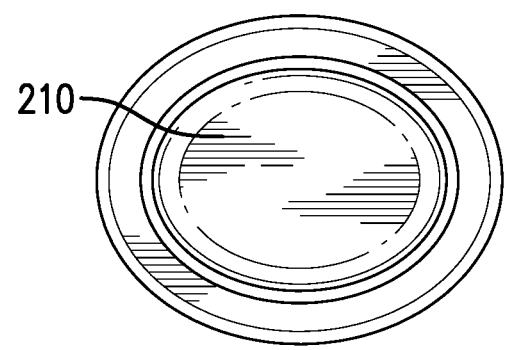
FIG. 2B illustrates a top view of the dispenser of FIG. 2 according to an embodiment.

Another example of a dispenser is illustrated in FIGS. 2A and 2B. Similar to the embodiment of FIGS. 1A and 1B, the dispenser 200 comprises a cap 210, a housing 212, and a push cup 214. Unlike the embodiment of FIG. 1, in which the cap 110 and the housing 112 are generally round in shape, in the illustrated, non-limiting embodiment, the cap 210 and/or the housing 212 have a generally oval shape. Although the cap 110, 210 and the housing 112, 212 are illustrated as having substantially similar shapes, it should be understood that in some embodiments, the external shape of the cap 110, 210, may be different than the shape of the portion of the housing 112, 212, configured to coupled to the cap 110, 210. The housing 112, 212 may be molded, or alternatively, may be formed from a rolled-paper material. In some embodiments, the cap 110, 210, the housing 112, 212, and the push cup 114, 214 can be fiber-, paper- or paper foam-based. In some embodiments, the cap 110, 210, the housing 112, 212, and the push cup 114, 214 can be made from thermoformed pulp.

Figure 3:
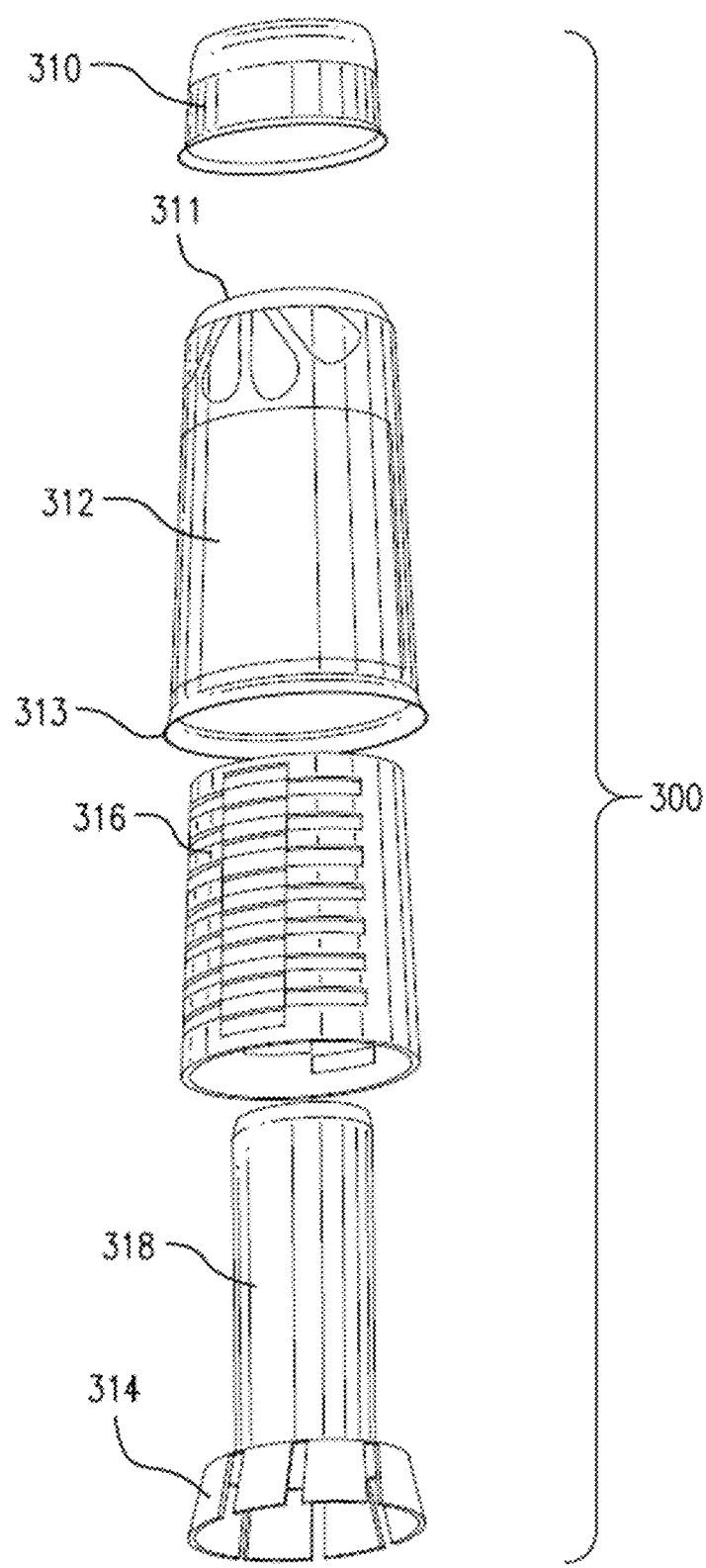
FIG. 3 depicts an exploded view of a dispenser according to an embodiment.

With reference now to FIG. 3, a dispenser 300 is illustrated having a cap 310, a housing 312, and a push cup 314 similar to that described above with respect to FIGS. 1 and 2. In an embodiment, the cap 310, the housing 312, and the push cup 314 are paper-based, for example, pulp-based. As shown, the dispenser 300 may additionally include a sleeve 316, and a cosmetic product 318, for example, a cream stick. As shown, the cosmetic product 318 is receivable at or within a hollow interior or void of the sleeve 316, and both the cosmetic product 318 and sleeve 316 are receivable within the inner volume of the housing 312. In an embodiment, the cosmetic product 318 may be output from the dispenser 300 via the aperture formed at the first open end 311 of the housing 312.

Figure 4:
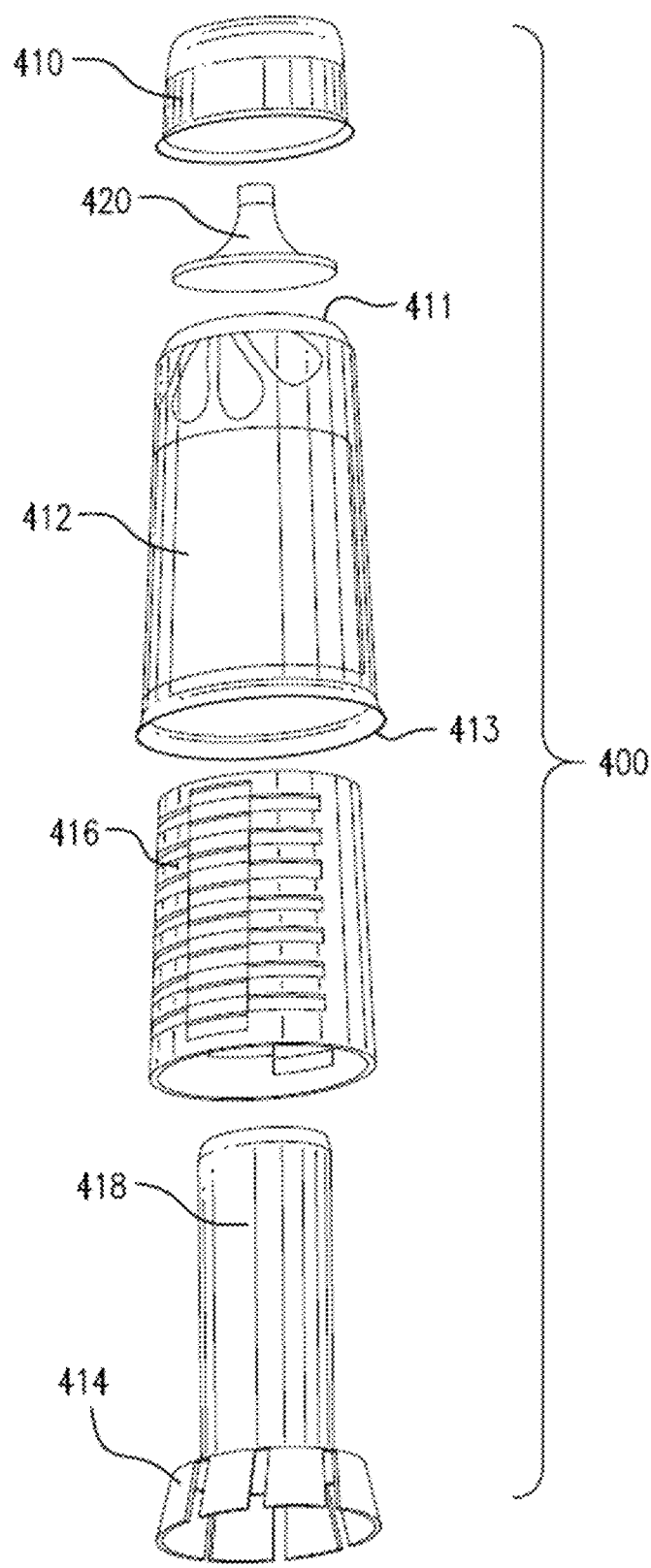
FIG. 4 provides an exploded view of another dispenser according to an embodiment.

The cap 410, housing 412, push cup 414, sleeve 416, and cosmetic product 418 of the dispenser 400 shown in FIG. 4 are substantially identical to the corresponding components of the dispenser 300 of FIG. 3. Further, as previously described, one or more, for example all, of the cap 410, the housing 412 and the push cup 414 are paper-based, for example, pulp-based. In the illustrated, non-limiting embodiment, the dispenser 400 further includes a nozzle 420. As shown, the nozzle 420 is typically positioned adjacent the first end 411 of the housing 412, such as at a location between the housing 412 and the cap 410. In such embodiments, the nozzle 420 may be permanently or removably mounted within the dispenser 400. The outlet of the nozzle 420 is typically smaller than the aperture of the first end 411 of the housing 412. Further, although the nozzle 420 is illustrated as having an narrow outlet, it should be understood that embodiments having a larger outlet are also within the scope of the disclosure. In embodiments of the dispenser 400 including the nozzle 420, the cosmetic product 418 is output from the housing 412 via the nozzle 420. Accordingly, in an embodiment, the nozzle 420 is suitable for use with less viscous cosmetic products 418, such as toothpaste for example.

Figure 5:
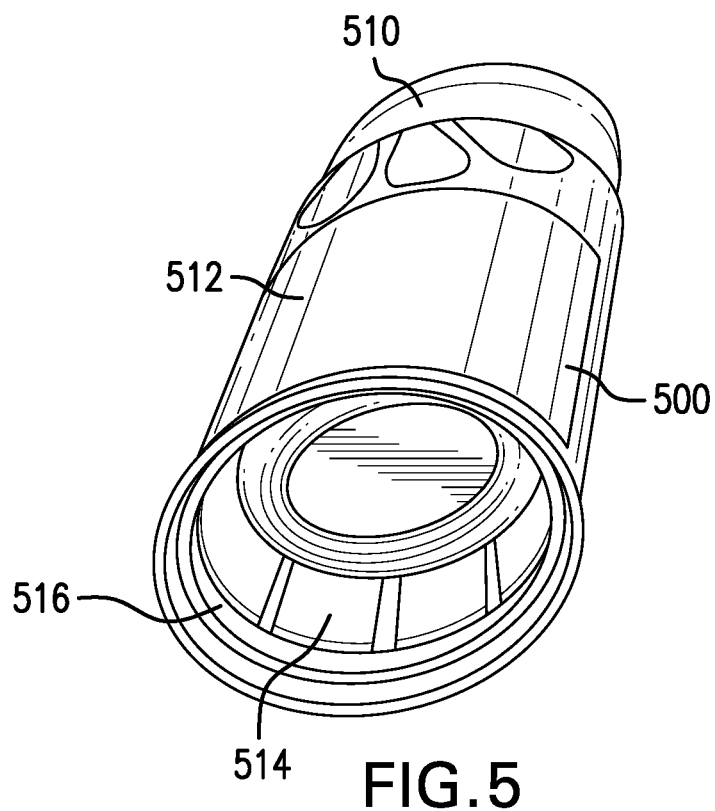
FIG. 5 illustrates a perspective bottom view of a dispenser according to an embodiment.

Turning now to FIG. 5, yet another example of a dispenser 500 is illustrated including a cap 510, a housing 512, a push cup 514, a die cut paperboard sleeve 516, and a cosmetic product 518 (not shown), such as a cream stick for example. The a cap 510, a housing 512, a push cup 514, a sleeve 516, and a cosmetic product 518 may be substantially similar to those described in the previous embodiments. As best shown in FIG. 5, when the push cup 514 is installed within the housing 512, the push cup 514 is engaged with the sleeve 516 and is configured to remain completely within the inner volume of the housing 512.

An example of a die cut paperboard 600, transformable into a sleeve 316, 416 and 516 as described above is illustrated in FIG. 6. As shown, the die cut paperboard 600 has a base 610 and a plurality of openings 612 formed in the base 610. The plurality of openings 612 may be arranged to form one or more pre-defined patterns. In the illustrated, non-limiting embodiment, the plurality of openings 612 are arranged in rows and columns. In another embodiment of a similar die cut paperboard 700, illustrated in FIGS. 7A and 7B, the plurality of openings 712 are arranged substantially parallel to one another and are slanted relative to the base 710.

Figure 7A:
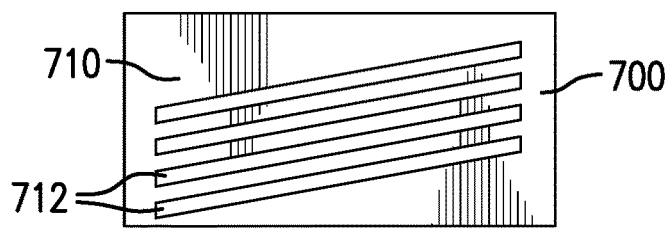
FIG. 7A depicts another example die cut paperboard before assembly according to an embodiment.
Figure 7B:
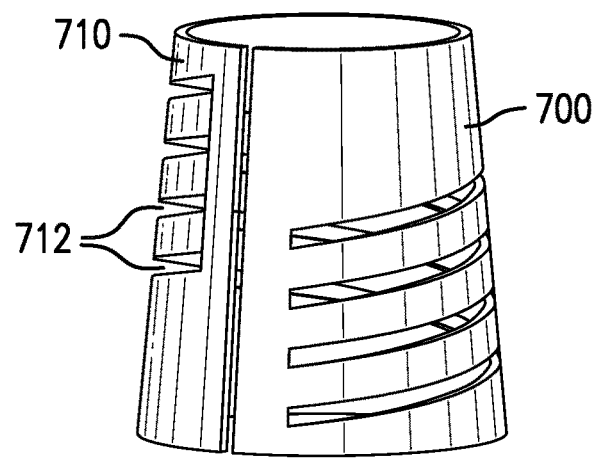
FIG. 7B depicts a perspective view of the die cut paperboard of FIG. 7A after assembly according to an embodiment.

As best shown in FIG. 7B, the die cut paperboard 700 is transformable prior to installation within the housing of a dispenser, such as any of the dispensers described herein. In the transformed or in-use configuration, the die cut paperboard 700 is formed into a sleeve. In this configuration, the paperboard sleeve 700 is insertable into the inner volume of the housing and can be attached to the inside of the housing via an adhesive or other suitable connector. In the illustrated, non-limiting embodiment, the sleeve is generally conical or frustoconical in shape. However, embodiments where the sleeve 700 has another shape, such as a cylindrical shape, a round shape or a novel shape for example, are also contemplated herein. When the paperboard is formed into a sleeve, the plurality of slanted openings 712 form one or more pre-defined patterns, for example, a spiral pattern on the base 710, and each opening 712 forms a corresponding spiral slot on the base 710.

The sleeve 700 may be formed by rolling the one or more paper sheets that form the paperboard base 710. Alternatively, the sleeve 700 can be formed by means of fiber thermoforming in a mold. The openings 712 formed into the paperboard base 710 can be formed before or after forming the sleeve, such as via a die or laser cut, or alternatively, via one or more molds.

Figure 8A:
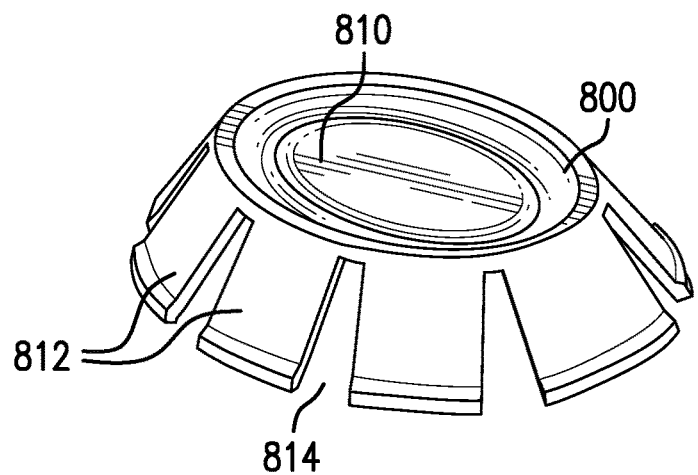
FIG. 8A shows a perspective view of an example push cup as molded according to an embodiment.
Figure 8B:
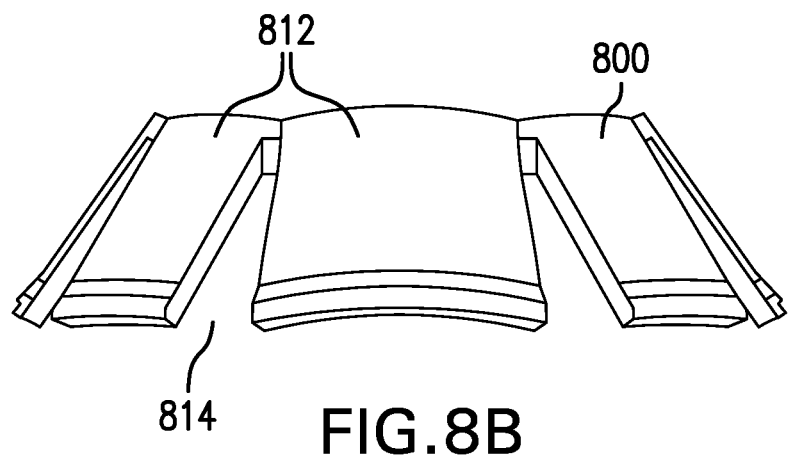
FIG. 8B shows a side view of the push cup of FIG. 8A according to an embodiment.

With reference now to FIGS. 8A-8B, an example of a push cup 800 similar to that described with respect to FIGS. 1-5 is illustrated in more detail. As shown, the push cup 800 comprises a base 810 and a plurality of substantially identical tabs 812 protruding from the base 810, such as from an outer periphery of the base 810 for example. Although the plurality of tabs 812 are illustrated as protruding downwardly at an angle relative to the base 810, such as at an angle of about 30 degrees, about 45 degrees, or about 60 degrees, it should be understood that the tabs 812 may be formed at any suitable angle, such as between 0-90 degrees for example. In some embodiments, the push cup 800 is formed with a draft angle in an open position to create a spring force while in use. In the illustrated, non-limiting embodiment, the plurality of tabs 812 are separated from one another, for example equidistantly spaced about the periphery of the base 810. The plurality of tabs 812 may be sized such that in-between adjacent tabs 812 is an opening 814.

In an embodiment, the push cup 800 is a molded component and may have a shape as-molded, as represented in FIG. 8A. The push cup 800 may be formed via any suitable method or combination of methods, including but not limited to, paper thermoforming, die cut and folded or shaped for use, paper formed on a mandrel, injection molded, and blow-molded for example. In an embodiment, the base 810 of the push cup 800 includes a push platform or topology configured to receive or support a cosmetic product. The push cup 800 may be shaped to interlock with a sleeve, as will be described in more detail below.

Figure 8C:
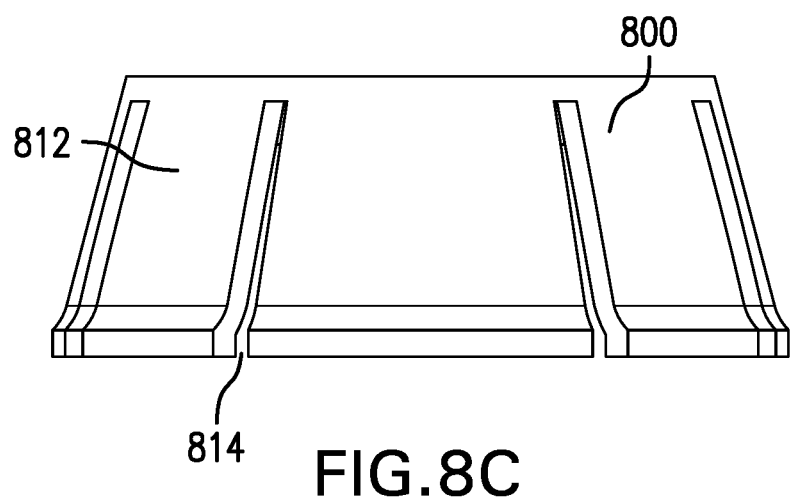
FIG. 8C shows a side view of the push cup of FIG. 8A in use according to an embodiment.

The push cup 800 may be transformable from an as-molded configuration to an in-use configuration, as shown in FIG. 8C. In the in-use configuration, the push cup 800 is configured to move inside of the dispenser, such as within the inner volume of the housing. The push cup 800 is pliable in that it can change its shape due to the external pressure and/or geometric confines. For example, the tabs 812 of the push cup 800 can be bent inwardly to transform the push cup 800 between the as-molded and in-use configurations. As a result of this movement, the openings 814 may become narrower than what is shown in the as-molded configuration shown in FIGS. 8A and 8B. Alternatively or in addition, the base 810 can change shape due to the external pressure and/or geometric confines. For example, the circumference of the base 810 can change, such as having a longer or shorter circumference in-use when compared with the circumference as-molded.

Figure 9A:
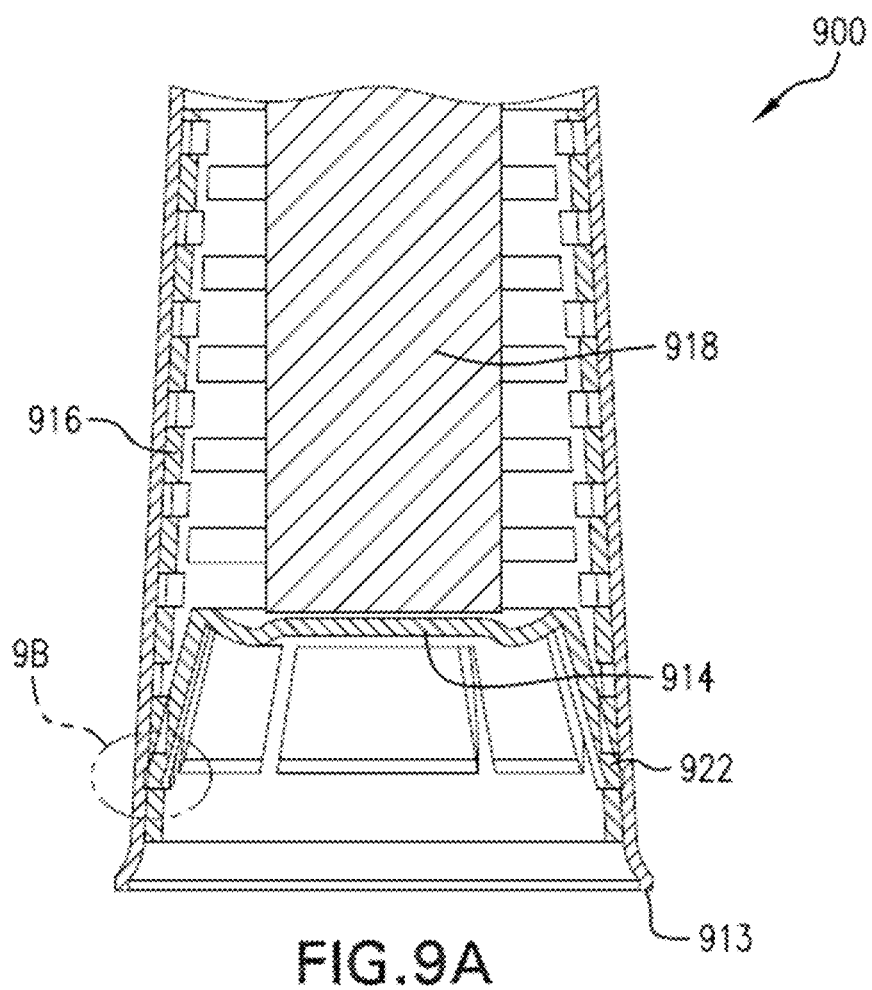
FIG. 9A illustrates a partial section view of a dispenser according to an embodiment.
Figure 9B:
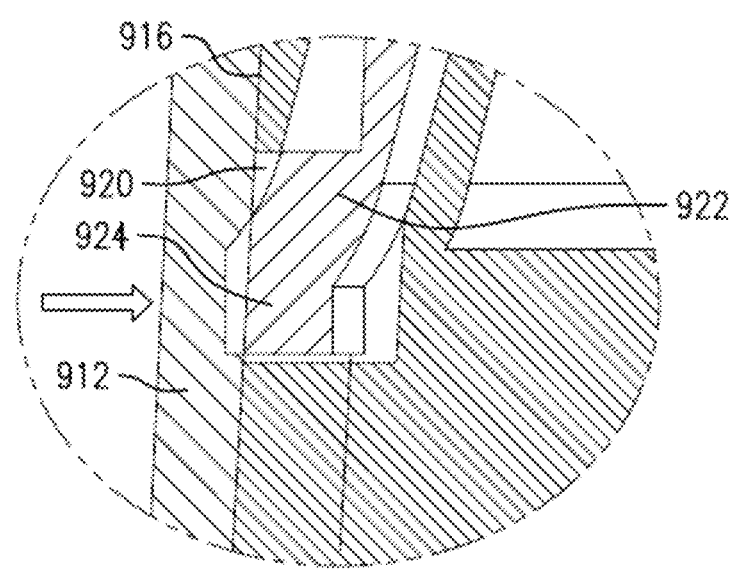
FIG. 9B illustrates a magnified view of the dispenser of FIG. 9A according to an embodiment.

Turning now to FIG. 9A a cross-sectional view of a dispenser, similar to any of the dispenser 100, 200, 300, 400, and 500, is partially shown with a housing 912, a push cup 914, a sleeve 916, and a cosmetic product 918. FIG. 9B shows a magnified view of the engagement of the push cup 914 and the sleeve 916. In an embodiment, the slot/openings 920 formed in the sleeve 916 provide a mechanism to move the push cup 914 (together with the cosmetic product) upward and downward within the housing 912. For example, the tabs 922 of the push cup 914 may be configured to couple with the openings or slots 920 formed in the sleeve 916.

In an embodiment, a distal or free end of a tab 922 protrudes into and engages an adjacent opening 920 to couple the components. When an external pressure is applied to the push cup 914, such as by twisting or by pushing the push cup 914, the tabs can disengage with the slot/openings, move sideways, upward or downward. These features and this engagement are enabled by the pliable nature of the paper-based push cup 914 and the sleeve 916. Alternatively, or in addition, the molded topology of the push cup 914 may provide structure and a spring force that facilitates the engagement of the tabs 922 of the push cup 914 with the slots or openings 920 formed in the sleeve 916.

As shown in FIGS. 9A and 9B, in an embodiment, the tabs 922 on the push cup can comprise locking edges 924 which can snap into slots or grooves (openings) 920 formed on the paperboard sleeve 916. In an embodiment, these locking edges 924 may include a foot that is located at and protrudes from a distal or free end of the tab 922. This foot may be configured to cooperate with and engage a respective edge of an opening 920.

Figure 6:
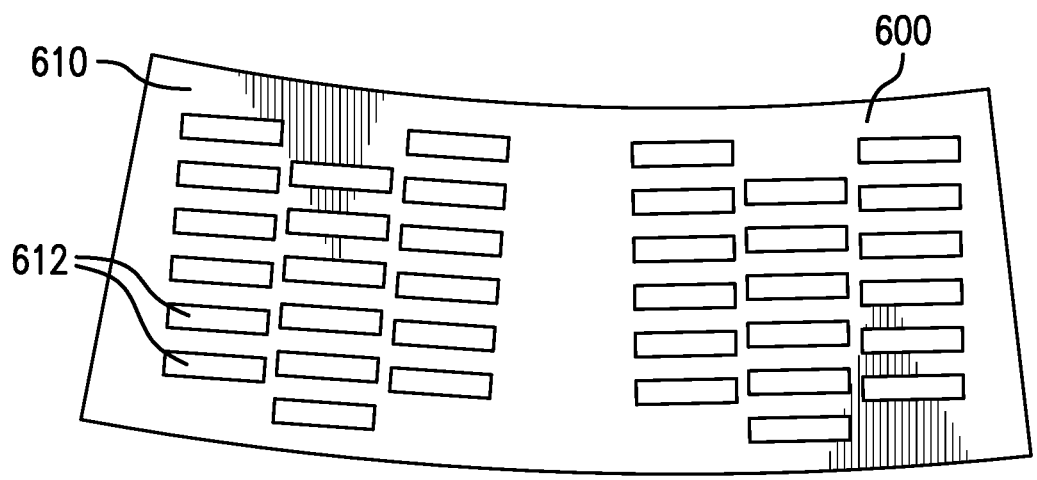
FIG. 6 shows an example of a die cut paperboard according to an embodiment.

When a user pushes a push cup upward relative to the sleeve (for example, when the dispenser comprises a sleeve as shown in one of FIGS. 3, 4, and 6), the tabs (or locking edge or spring teeth) of the push cup can snap into the openings on the paperboard sleeve. This connection between the push cup and sleeve holds the push cup in a steady position within the inner volume of the housing and prevents the push cup from unintended movement downwards.

In some embodiments, the dispenser comprises the sleeve as shown in FIG. 7B. The spiral slots of the sleeve provide a track for the tabs (or locking edge or spring teeth) of the push cup to slide through. Accordingly, the spiral slots may define the upward and downward movement of the push cup within the housing.

Figure 10A:
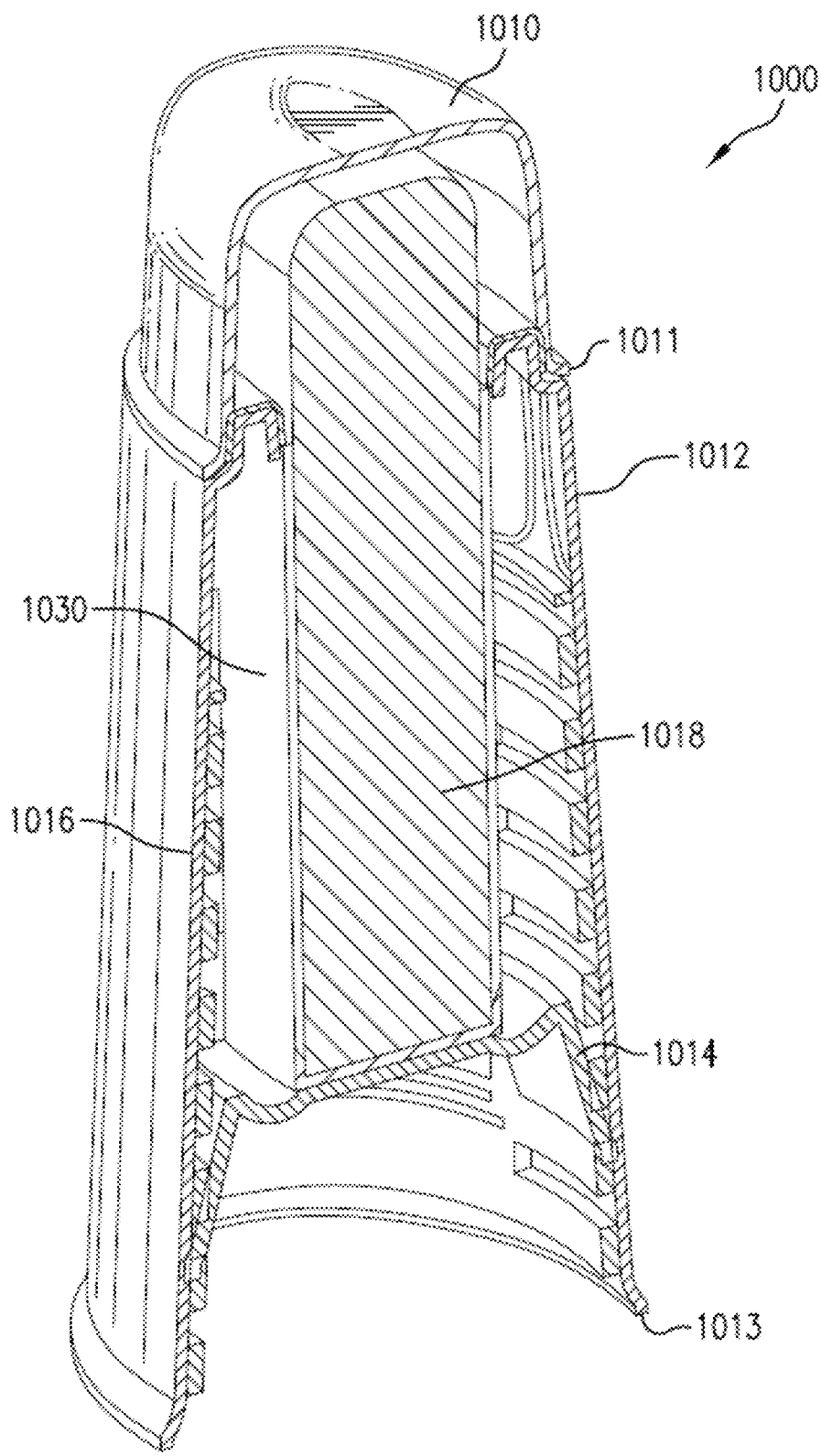
FIG. 10A shows a perspective cross-section view of a dispenser according to an embodiment.
Figure 10B:
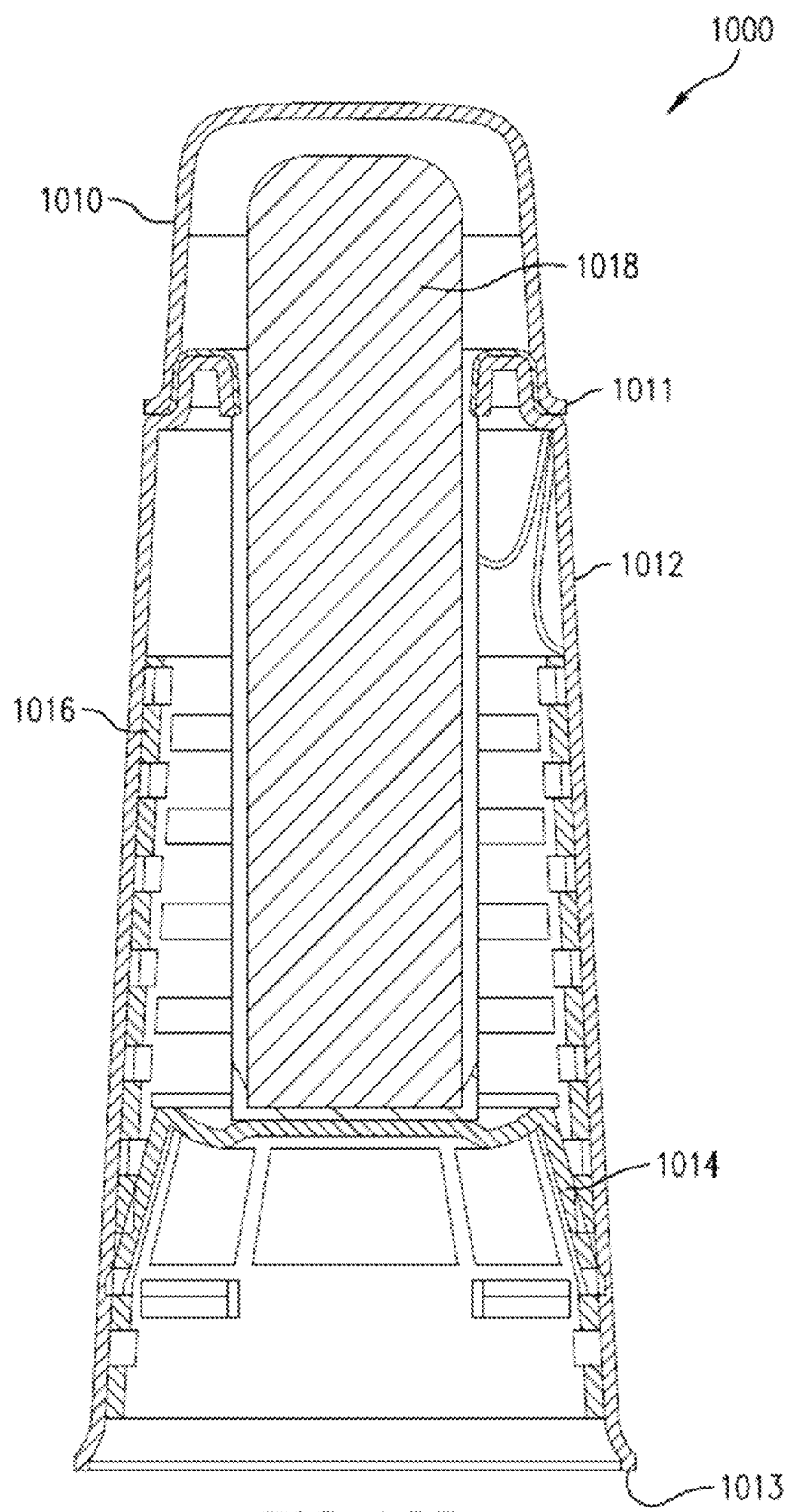
FIG. 10B shows a section view of another example dispenser according to an embodiment.

Turning now to FIGS. 10A-10B, different section views or perspective sections views of an example dispenser is illustrated. The dispenser 1000 may be similar to any of the embodiments of a dispenser previously described. FIG. 9A shows a partial view of FIG. 10B. In the illustrated, non-limiting embodiment, the dispenser 1000 includes a liner 1030 configured to protect the housing or outer structure 1012, such as at the first end 1011 thereof, from contamination or discoloration from the cosmetic product 1018, for example, deodorant or lip balm. The liner 1030 can be a thin walled liner insert that is made of a polymer, biodegradable resin or coated paper/fiber that collapses. The liner 1030 may be flexible and may provide a barrier for the deodorant or lip balm as the product is consumed and the push cup 1014 is moved upwards. The liner 1030 can be formed by any suitable method, including but not limited to melt-phase forming technology, deep draw thin walled thermoforming, thermoforming, blow or stretch molding, injection molding. In other embodiments, the liner 1030 may be formed from a paper sheet coated with a polymer, or a paper structure having an embedded chemical operable to form a barrier.

Figure 11:
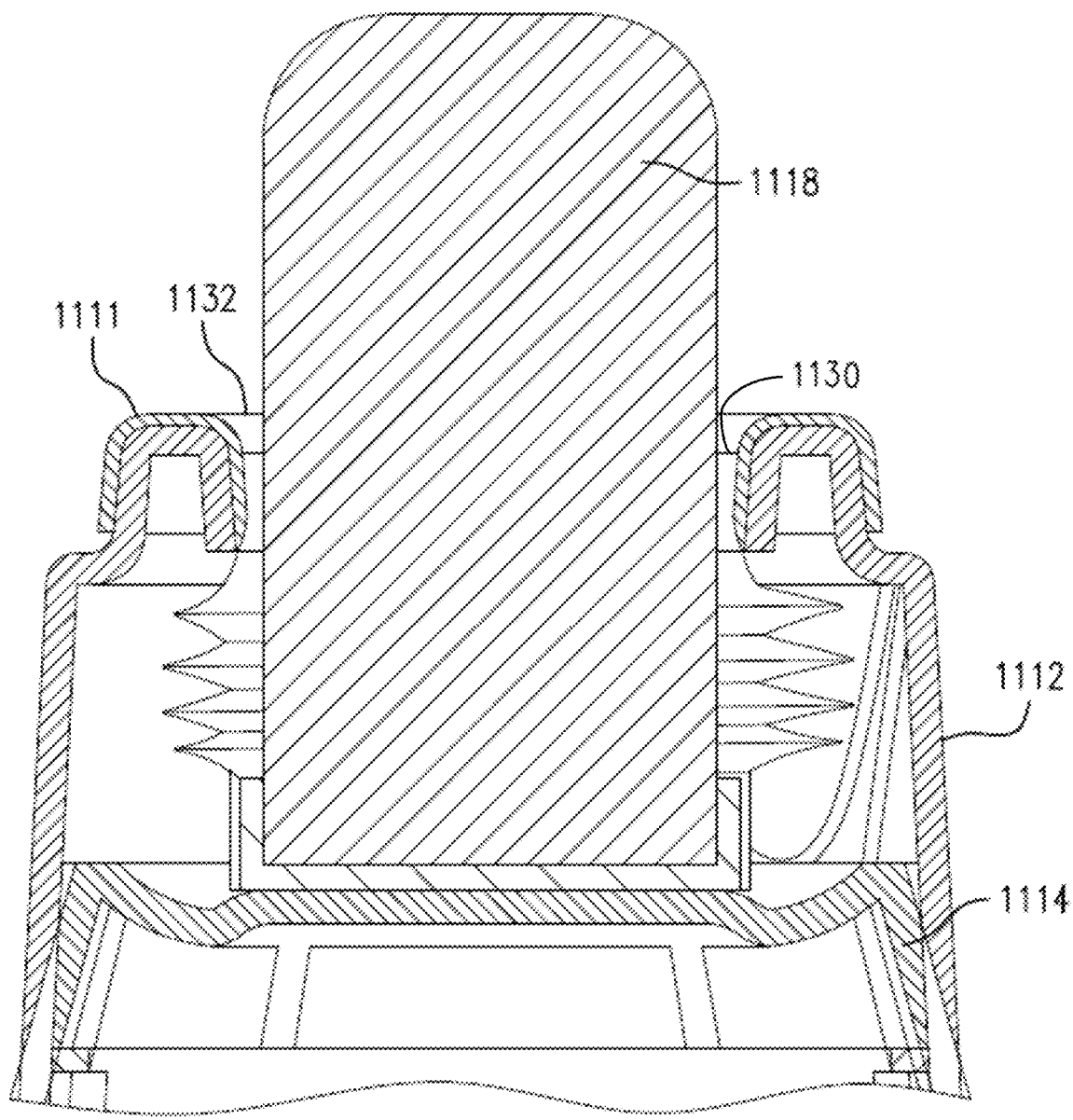
FIG. 11 shows a section view of still another example dispenser according to an embodiment.

Turning now to FIG. 11, an example dispenser comprises a housing or outer structure 1112, a push cup 1114, a liner 1130 that may provide a barrier at a first end 1111, and a larger aperture 1132 (similar to that shown in FIG. 3) or small nozzle (similar to that shown in FIG. 4) that accommodate solid products 1118 (e.g., deodorant) or less viscous products (e.g., toothpaste).

It should be understood from the foregoing that, while particular implementations have been illustrated and described, various modifications can be made thereto and are contemplated herein. It is also not intended that the disclosure be limited by the specific examples provided within the specification. While the disclosure has been described with reference to the aforementioned specification, the descriptions and illustrations of the embodiments herein are not meant to be construed in a limiting sense.

Furthermore, it shall be understood that all aspects of the disclosure are not limited to the specific depictions, configurations or relative proportions set forth herein which depend upon a variety of conditions and variables. Various modifications in form and detail of the embodiments of the disclosure will be apparent to a person skilled in the art. It is therefore contemplated that the disclosure shall also cover any such modifications, variations and equivalents.

What is claimed is:

1. A dispenser comprising:
   a housing defining a first and a second end and having an inner volume formed between the first end and the second end;
   a push cup movable within the inner volume of the housing; and
   a sleeve arranged within the inner volume at a position between the first end and the second end,
   wherein the sleeve is formed by rolling a paperboard into a shape having a circular or oval cross-section at a first terminal end and having a circular or oval cross-section at a second terminal end.

2. The dispenser of claim 1, further comprising a cosmetic product arranged within the inner volume upwardly adjacent the push cup.

3. The dispenser of claim 2, wherein the cosmetic product and the push cup are movable together within the inner volume of the housing.

4. The dispenser of claim 2, wherein the sleeve has a hollow interior and the cosmetic product is arranged within the hollow interior.

5. The dispenser of claim 1,
   wherein the push cup is configured to engage with a first opening or a first set of openings of the sleeve such that the push cup and the sleeve are engaged at a first position,
   wherein the push cup is configured disengage from the first opening or the first set of openings to move upwardly and/or downwardly with respect to the sleeve within the inner volume of the housing, and
   wherein the push cup is configured to engage with a second opening or a second set of openings of the sleeve such that the push cup and the sleeve are engaged at a second position.

6. The dispenser of claim 1, wherein the sleeve includes a plurality of openings formed therethrough, and the push cup is configured to engage with one or more of the plurality of openings.

7. The dispenser of claim 6, wherein the push cup comprises a plurality of tabs that are separated from each other by slits formed therebetween and that engage with one or more of the plurality of openings to engage the push cup and the sleeve.

8. The dispenser of claim 7, wherein, as the push cup is pushed upward towards the first end, the plurality of tabs are forced closer to each other by the sleeve.

9. The dispenser of claim 6, wherein the push cup comprises a plurality of tabs having locking edges at an outermost and lowermost end thereof that engage with one or more of the plurality of openings of the sleeve.

10. The dispenser of claim 6, wherein the plurality of openings are parallel to each other and slanted.

11. The dispenser of claim 1, wherein the push cup includes a plurality of tabs, at least one of the plurality of tabs being receivable within the plurality of openings to couple the push cup to the sleeve.

12. The dispenser of claim 1, wherein the push cup includes a plurality of tabs, at least one of the plurality of tabs being configured to engage the sleeve.

13. The dispenser of claim 1, further comprising a liner arranged within the inner volume and extending to the first end of the housing.

14. The dispenser of claim 13, further comprising a cosmetic product arranged within the inner volume, the liner being arranged between the cosmetic product and the housing.

15. The dispenser of claim 1, further comprising a nozzle mounted at the first end of the housing, wherein the nozzle forms an outlet of the dispenser.

16. The dispenser of claim 15, wherein an outlet of the nozzle is smaller than an aperture at the end of the housing.

17. The dispenser of claim 1, further comprising a cap movably mounted to the first end of the housing.

18. The dispenser of claim 1, wherein at least one of the housing and the push cup is formed from a paper-based material.

19. The dispenser of claim 18, wherein at least one of the housing and the push cup is formed from a pulp-based material.

20. The dispenser of claim 1, wherein the sleeve narrows continuously from the second end to the first end.

* * * * *